United States Patent [19]
Landmeier

[11] Patent Number: 5,856,639
[45] Date of Patent: Jan. 5, 1999

[54] POINTER POSITION DETECTION SYSTEM USING A SIGNAL PROCESSOR IN THE POINTER

[75] Inventor: Waldo L. Landmeier, Phoenix, Ariz.

[73] Assignee: CalComp Inc., Anaheim, Ca

[21] Appl. No.: 520,116

[22] Filed: Aug. 28, 1995

[51] Int. Cl.$^6$ .............................. G08C 21/00; G09G 3/02
[52] U.S. Cl. .............................. 178/18; 178/19; 345/174; 345/179
[58] Field of Search ........................ 178/18, 19; 345/173, 345/174, 179

[56] References Cited

U.S. PATENT DOCUMENTS

| | | | |
|---|---|---|---|
| 4,672,154 | 6/1987 | Rodgers et al. | 178/19 |
| 4,878,553 | 11/1989 | Yamanami et al. | 178/18 |
| 5,247,137 | 9/1993 | Epperson | 178/18 |
| 5,276,282 | 1/1994 | Russell | 178/19 |
| 5,294,792 | 3/1994 | Lewis | 345/180 |
| 5,552,568 | 9/1996 | Onodaka | 345/179 |
| 5,557,076 | 9/1996 | Wieczorek | 178/19 |

*Primary Examiner*—Curtis Kuntz
*Assistant Examiner*—Vijay Shankar
*Attorney, Agent, or Firm*—Frederic P. Smith; William F. Porter, Jr.

[57] ABSTRACT

A pointer position detection system for use in determining the position of a pointer relative to a tablet comprising a signal generating system coupled to the tablet for transmitting a driving signal, the signal generating system including a set of conductors for radiating the driving signal and the driving signal including information as to the particular conductor being activated by the signal generating system, a movable pointer responsive to the transmitted driving signal, the pointer including a signal processor responsive to the information and the amplitude of the driving signal on a selected plurality of successive conductors for generating a positional signal and causing the positional signal to be transmitted a selected time after receipt of the information and the amplitudes and further including a transmitter system coupled to the signal processor for transmitting the positional signal, and a signal detector system for detecting the transmitted positional signal.

2 Claims, 2 Drawing Sheets

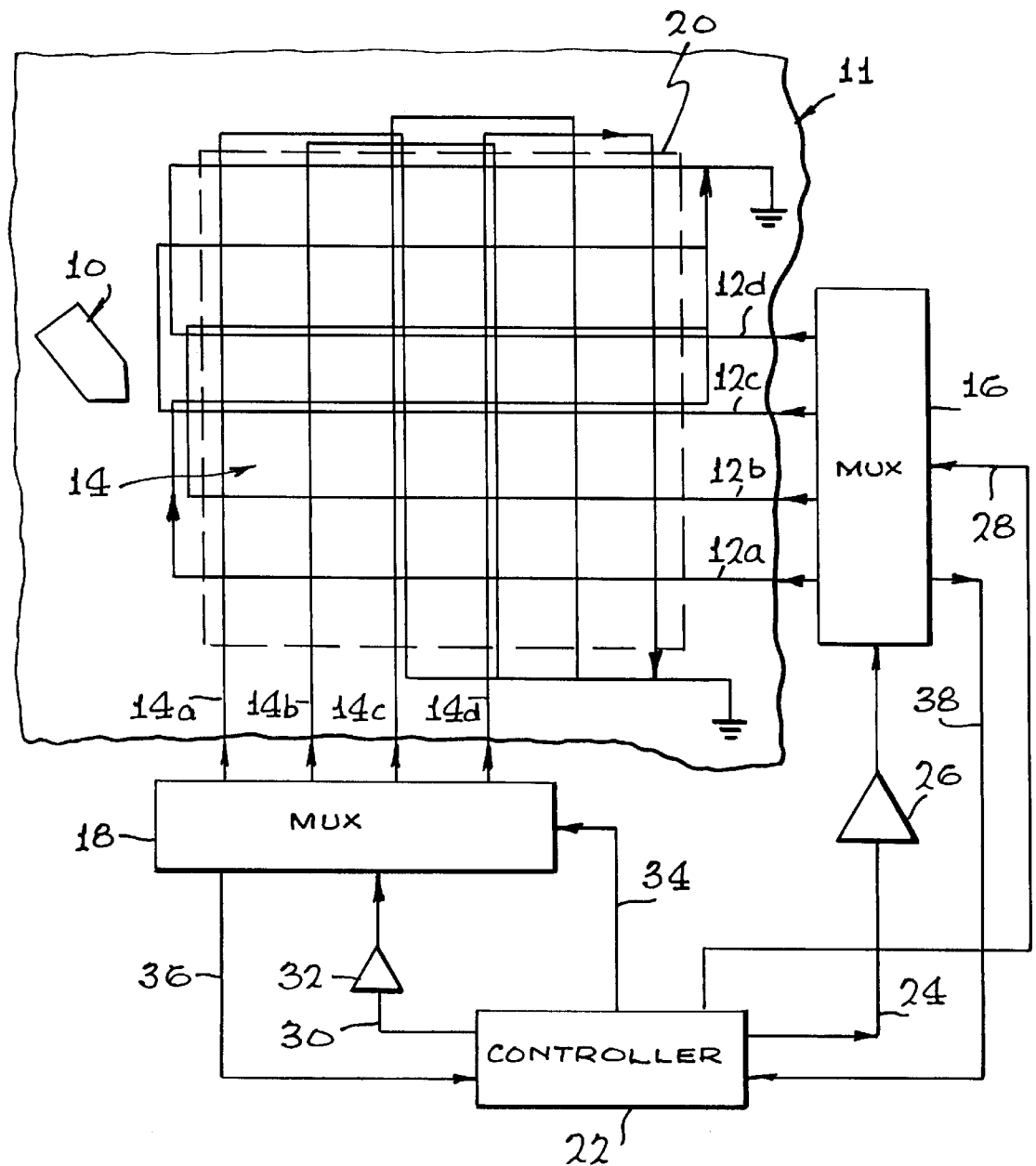

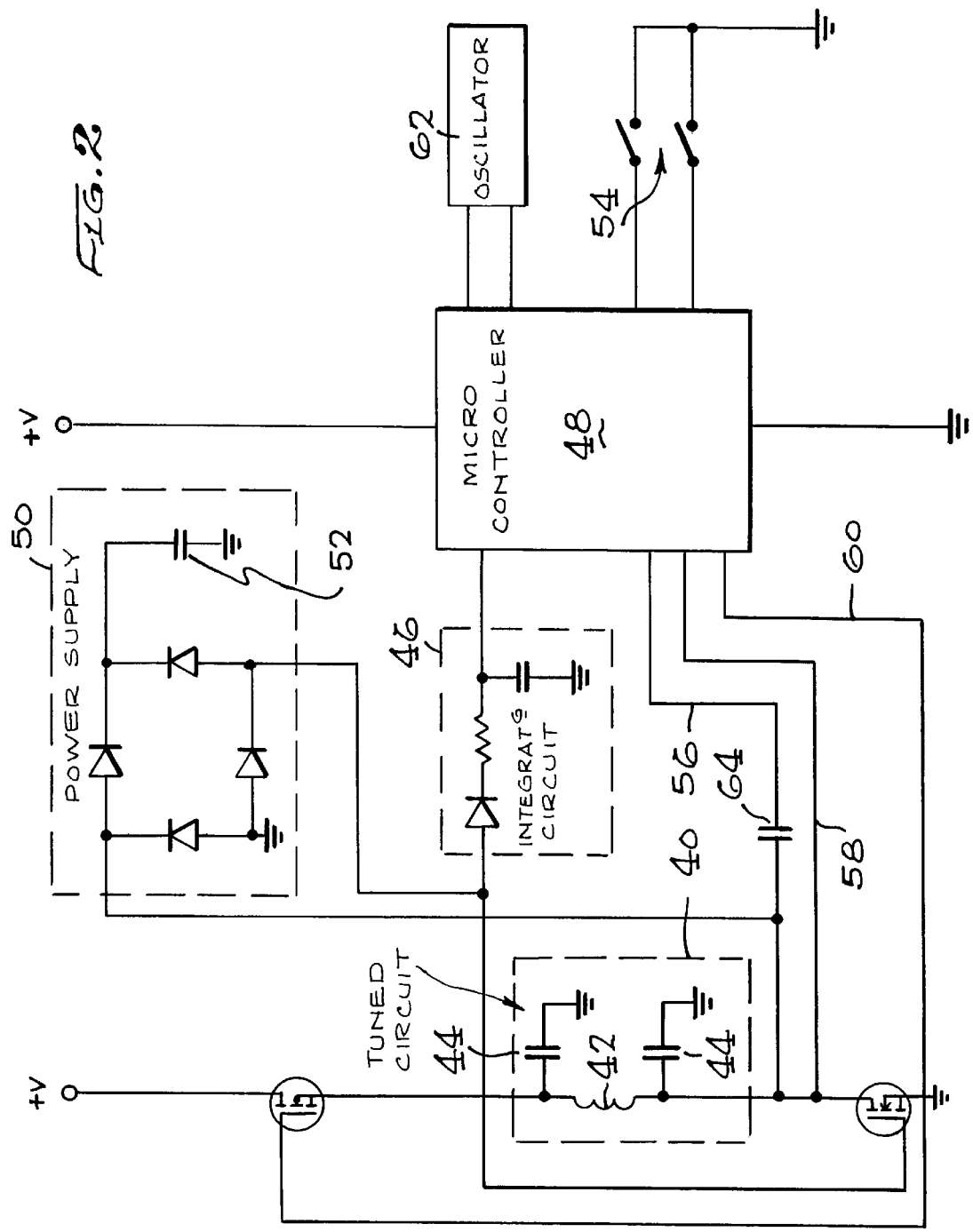

POINTER POSITION DETECTION SYSTEM USING A SIGNAL PROCESSOR IN THE POINTER

BACKGROUND OF THE INVENTION

1. Field of the Invention

This invention relates to the field of graphic digitizer systems and, in particular, to a graphic digitizer system which utilizes an improved pointer position detection system.

2. Description of Related Art

Graphic digitizer systems are used in the art for translating the position of a point on a plan or drawing into coordinates recognizable by a computer. A number of well known graphic digitizer systems make use of a movable coil and a work surface defined by one or more receiving grids of conductors. The coil may be disposed within the tip of a pen-shaped instrument and an oscillator is provided which supplies an ac driving signal of predetermined frequency and magnitude to the coil, which is inductively coupled to the conductors of the grid. In accordance with well known principles of electromagnetic theory, ac signals are induced in the grid conductors at a magnitude and phase that depend on the location of the coil relative to the conductors. Generally, the signals induced in the conductors will have a magnitude that varies from zero at the coil center to a maximum at the periphery and tapering off beyond. Furthermore, the phase of the signals induced in the conductors at one side of the coil will be the opposite of (180 degrees displaced from) that of signals induced in the conductors at the other side.

While in previous systems the movable coil was powered by a cable connecting the oscillator and the ac driving signal to the coil, or an ac oscillator was located in the pointer together with a battery for power, recent systems have utilized the grid itself as a transmitting antenna by applying the ac driving signal to the grid and having a tuned circuit in a pen-shaped pointer which receives the ac power signal and then acts as a transmitter to induce ac positional signals in the grid, whose conductors are accessed through the use of multiplexer circuitry to couple the induced signals to detection circuitry to locate the pointer. Such a so-called passive pointer digitizer system is disclosed in U.S. Pat. No. 4,875,553 issued Nov. 7, 1989 to Yamanami et al., entitled "Position Detecting Apparatus." This system requires, however, that the same X or Y conductor of the grid which acts as a transmitter also acts as a receiver in order that positional information be obtained from the radiated and reradiated signal, and thus requires that the ac driving signal be removed for a sufficient period of time from the X or Y conductor of the transmitting grids before the same such X or Y conductor of the now receiving grids are accessed to enable confusing clutter and transients to subside and to enable the ac driving signal to sufficiently decay so as not to be detected by the X or Y conductors. This results in a discontinuous communication path and a 50% or less duty cycle for receiving energy from the pointer. In addition, since the same wire that radiated the signal must now receive it, only a limited signal-to noise ratio can be obtained and the system has a high sensitivity to outside noise sources.

Thus, it is a primary object of the present invention to provide an improved pointer position detection system.

It is another object of the present invention to provide an improved pointer position detection system that is highly efficient.

It is a further object of the present invention to provide an improved pointer position detection system which uses a full-time driving signal and has a 100% receive time and offers a continuous communication path between the pointer and the receiving system.

It is still another object of the present invention to provide an improved pointer position detection system which has a greatly improved signal-to-noise ratio.

It is a further object of the present invention to provide an improved pointer position detection system which has a high immunity to outside noise sources.

SUMMARY OF THE INVENTION

A pointer position detection system for use in determining the position of a pointer relative to a tablet comprising a signal generator system coupled to the tablet for transmitting a driving signal, a movable pointer responsive to the transmitted driving signal, the pointer including a signal processor responsive to the driving signal for processing information contained in the driving signal and for generating a processed signal indicative thereof and further including a transmitter system coupled to the signal processor for transmitting the processed signal, and a signal detector system for detecting the transmitted processed signal. In a preferred embodiment, a controller is coupled to the signal generator system and the signal detector system and is responsive to a selected plurality of successive processed signals for determining the location of the pointer relative to the tablet. An X-grid and a Y-grid of conductors are used to sequentially transmit the driving signal and the entire Y-grid and X-grid, respectively, are used sequentially to receive the processed signal. The movable pointer includes a storage circuit to store energy from the driving signal to provide power to the signal processor and the transmitter system. In an alternative embodiment, the driving signal is indicative of selected positions on the tablet and the signal processor determines the position of the pointer relative to the tablet and generates a positional signal indicative thereof, the transmitter system transmitting the positional signal and the signal detecting system detecting the transmitted positional signal. In particular, the driving signal includes information as to the particular conductor being activated by the signal generator system and the signal processor is responsive to such information and to the amplitude of the driving signal on a selected plurality of successive conductors for generating a positional signal and causing the positional signal to be transmitted a selected time after receipt of the information and the amplitudes.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 1 is a block diagram illustrating the structure and operation of the present invention.

FIG. 2 is a circuit diagram of the circuitry of the pointer of the present invention.

DESCRIPTION OF THE PREFERRED EMBODIMENT

Referring now to FIGS. 1 and 2, the structure and operation of the present invention is illustrated. A pointer 10 whose position is to be determined relative to a tablet 11 is shown placed adjacent to overlayed X-Y grids 12,14 of conductors 12a–d,14a–d generally deposited on tablet 11. Each separate conductor has, for greater efficiency, one or more loops, with the separate conductors having overlapping loops. The loops may, if desired, have a plurality of turns. Grids 12,14 are used both as driving grids and receiving grids and are coupled to multiplexers 16,18. The region of use of the overlayed grids 12,14 for the pointer 10 is designated by the dashed line 20 inside of which the conductors 12a–d are orthogonal to conductors 14a–d and any portions of conductors 12a–d which are parallel to portions of conductors 14a–d are sufficiently spaced from one another so as to be decoupled. The digitizer system is controlled by controller 22, generally a microprocessor, which sends an ac driving signal along line 24 through amplifier 26 to multiplexer 16 and controls which of the particular conductors 12a–d of grid 12 receive the driving signal by means of an address signal along line 28. In a like manner, controller 22 subsequently sends an ac driving signal along line 30 through amplifier 32 to multiplexer 18 and controls by means of an address signal along line 34 coupled to multiplexer 18 which of the particular conductors 14a–d of grid 14 receive the driving signal. Controller 22 also controls multiplexers 16,18 along address lines 28,34 so that processed or positional signals received by all the conductors of grids 12 or 14, depending on which grid is being used to receive the driving signal, pass simultaneously along lines 36 or 38 to controller 22.

In operation then, in order to ascertain the position of pointer 10 adjacent to the grids 12,14, controller 22 initially generates an ac driving signal along line 24 and an address signal along line 28 so that the conductors 12a–d of the driving grid 12 selectively receive a driving signal. After the position of the pointer 10 has been determined with respect to the driving grid 12, controller 22 then generates an ac driving signal along line 30 and an address signal along line 34 so that the conductors 14a–d of the driving grid 14 selectively receive a driving signal. Pointer 10 is inductively coupled to the conductors 12a–d, 14a–d and, referring to FIG. 2, includes therein a tuned circuit 40, having coil 42 and capacitors 46, which is tuned to receive the driving signal. The conductors 12a–d, 14a–d act as transmitting antennas and induce ac signals in tuned circuit 40. After the driving signals have been processed in the pointer 10 to produce processed or positional signals, as described hereinafter, the tuned circuit 40 acts as a transmitter to induce ac processed or positional signals in the conductors 12a–d or 14a–d, depending on which grid is receiving the driving signal, which are all simultaneously passed along lines 36 or 38 to controller 22 by multiplexers 16 or 18 under control of address signals from controller 22 along lines 28 or 34.

As was stated previously, the driving signals are processed in pointer 10 to produce processed or positional signals. The driving signals are received in the tuned circuit 40 and are coupled to integrating circuit 46 which sends amplitude information to microcontroller 48. At the same time, the driving signals are coupled to power supply circuit 50 which stores energy from the driving signals in capacitor 52 for use in providing power for the microcontroller 48 and for transmitting processed or positional signals. If necessary, a battery could be used in place of the power supply circuit 50.

In a preferred embodiment, a three conductor locating system is used where amplitude information provided by three successive driving signals is processed by the microcontroller 48, such as by converting it to three digital signals representing each such amplitude. At the end of each driving signal, the pointer 10 transmits back to the tablet 11 and the controller 22 by means of the tuned circuit 40, under control of the microcontroller 48, amplitude information supplied by the driving signals during the three wire sequence. At the end of the third driving signal, button and/or pressure information received by the microcontroller 48 from the switch inputs 54 is also transmitted back to the tablet 11.

In an alternative embodiment, a three conductor locating system is used where the driving signal on each conductor 12a–d,14a–d is turned off for approximately 10% of its allocated time to enable an information bearing signal to be transmitted to and from the tablet 11. At the end of the first conductor "on time", the controller 22 sends a series of on/off energy bursts that tells the pointer 10 which conductor is presently transmitting a driving signal. At the end of the second conductor "on time", while the transmission from the tablet 11 is suspended, the pointer 10 transmits back to the tablet 11 and the controller 22 by means of the tuned circuit 40, under control of the microcontroller 48, button and/or pressure information received by the microcontroller 48 from the switch inputs 54. At the end of the third conductor "on time", the microcontroller 48 computes the location of the pointer 10 on the surface of the tablet 11 using the amplitude information supplied by the driving signals during the "on time" and the information provided by the controller 22 stated above and causes the tuned circuit 40 to transmit this information to the tablet 11 and the controller 22 in a like manner as the button and/or pressure information was transmitted in the previous transmission.

The position of the pointer 10 can be computed using a three conductor amplitude system and algorithms and techniques of the nature described in Ikedo, U.S. Pat. No. 4,088,842, issued May 9, 1978, in the Yamanami patent cited herein and in the prior art in general. In the above circuit, line 56 is used to carry data out, while line 58 is used to enable receive and line 60 is used to enable transmit. Oscillator 62 is used as the clock for microcontroller 48. Capacitor 64 is part of the tuning circuit 40 and is used to enable binary coded signals to be sent.

As is evident, the signal-to-noise ratio is greatly improved because the position detection is in the pointer and, therefore, has only a single 80 db loss rather than a double 80 db loss. Since the position of the pointer is ascertained in the pointer, the pointer is the receiver of the transmitted information from the tablet and has a high immunity to outside noise because the receiver is a tuned circuit and is small in size as contrasted to the prior art receiving grid, resulting in a 6,000 to 1 improvement in signal-to-noise ratio over present techniques. Furthermore, since the opposite axis grid can be used as a receiver for energy transmitted by the pointer, a continuous communication path between the pointer and the tablet is available to sense and control power to the pointer and for two-way communication between the pointer and the tablet.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

I claim:

1. A pointer position detection system for use in determining the position of a pointer relative to a tablet comprising:

signal generating means coupled to said tablet for transmitting a driving signal;

movable pointer means responsive to said transmitted driving signal, said pointer means including signal processor means responsive to said driving signal for processing information contained in said driving signal and for generating a processed signal indicative thereof and further including transmitting means coupled to said signal processing means for transmitting said processed signal, said signal generating means including a set of conductors for radiating said driving signal, three adjacent conductors being utilized to enable information pertaining to the particular conductor being activated by said signal generating means, information pertaining to the condition of said pointer means and information pertaining to the position of said pointer to be sequentially transmitted; and signal detecting means for detecting said transmitted processed signal.

2. A pointer position detection system for use in determining the position of a pointer relative to a tablet comprising:

signal generating means coupled to said tablet for transmitting a driving signal, said signal generating means including a set of conductors for radiating said driving signal and said driving signal including information as to the particular conductor being activated by said signal generating means;

movable pointer means responsive to said transmitted driving signal, said pointer means including signal processor means responsive to said information and the amplitude of the driving signal on a selected plurality of successive conductors for generating a positional signal and causing said positional signal to be transmitted a selected time after receipt of said information and said amplitudes and further including transmitting means coupled to said signal processing means for transmitting said positional signal; and signal detecting means for detecting said transmitted positional signal.

\* \* \* \* \*